US007855966B2

(12) United States Patent
Abdelilah et al.

(10) Patent No.: US 7,855,966 B2
(45) Date of Patent: Dec. 21, 2010

(54) NETWORK CONGESTION DETECTION AND AUTOMATIC FALLBACK: METHODS, SYSTEMS AND PROGRAM PRODUCTS

(75) Inventors: Youssef Abdelilah, Holly Springs, NC (US); Gordon T. Davis, Chapel Hill, NC (US); Jeffrey H. Derby, Chapel Hill, NC (US); Dongming Hwang, Apex, NC (US); Clark D. Jeffries, Chapel Hill, NC (US); Malcolm S. Ware, Austin, TX (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 11/348,417

(22) Filed: Feb. 7, 2006

(65) Prior Publication Data

US 2006/0209898 A1 Sep. 21, 2006

Related U.S. Application Data

(63) Continuation-in-part of application No. 09/906,406, filed on Jul. 16, 2001, now Pat. No. 7,068,601.

(51) Int. Cl.
*H04L 12/26* (2006.01)
(52) U.S. Cl. ...................... 370/236; 370/232
(58) Field of Classification Search ......... 370/231–237, 370/395.2–395.43, 538–540, 543–545, 468; 709/231–235, 247
See application file for complete search history.

(56) References Cited

U.S. PATENT DOCUMENTS

| 5,353,326 | A | 10/1994 | Jung |
| 5,426,640 | A | 6/1995 | Hluchyj et al. |
| 5,526,353 | A | 6/1996 | Henley et al. |
| 5,907,822 | A | 5/1999 | Prieto, Jr. |

(Continued)

OTHER PUBLICATIONS

Yin, N.; Hluchyj, M.G.; "A dynamic rate control mechanism for integrated networks", INFOCOM '91. Proceedings; Tenth Annual Joint Conference of the IEEE Computer and Communications Societies; Networking in the 90s; IEEE, 1991; pp. 543-552 vol. 2.

(Continued)

*Primary Examiner*—Thai D Hoang
(74) *Attorney, Agent, or Firm*—Yee & Associates, P.C.; Mark E. McBurney

(57) ABSTRACT

A codec detects congestion in a packet network and responds via a session control protocol to re-negotiate codec-type and/or parameters with the receiving codec to reduce bit rate for supporting a session. Once the connection and session are established, encoded packets start flowing between the two codecs. A control entity sends and receives network congestion control packets periodically in the session. The congestion control packets provide a "heartbeat" signal to the receiving codec. When the network is not congested, all "heartbeat" packets will be passed through the network. As network congestion increases, routers within the network discard excess packets to prevent network failure. The codecs respond to the missing packets by slowing down the bit rate or proceeding to renegotiate a lower bit rate via the session control protocol. If there are no missing packets, the codecs detect if the session is operating at the highest bit rate, and if not, re-negotiate a higher bit rate.

28 Claims, 4 Drawing Sheets

U.S. PATENT DOCUMENTS

| | | | |
|---|---|---|---|
| 5,909,443 | A | 6/1999 | Fichou et al. |
| 5,912,894 | A | 6/1999 | Duault et al. |
| 6,012,024 | A | 1/2000 | Hofmann |
| 6,018,515 | A | 1/2000 | Sorber |
| 6,163,766 | A * | 12/2000 | Kleider et al. .............. 704/229 |
| 6,456,714 | B2 * | 9/2002 | Shima et al. ........... 379/399.01 |
| 6,526,022 | B1 * | 2/2003 | Chiu et al. .................. 370/229 |
| 6,643,496 | B1 * | 11/2003 | Shimoyama et al. .......... 455/69 |
| 6,760,391 | B1 * | 7/2004 | Alb et al. .................... 375/354 |
| 2002/0004841 | A1 * | 1/2002 | Sawatari ..................... 709/232 |

OTHER PUBLICATIONS

Nuggehally S. Jayant P. Noll, "Digital Coding of Waveforms: Principles and Applications to Speech and Video", Prentice Hall, Engwood Cliffs, New Jersey, 1984; Chapter 1, pp. 1-25.

"Internet Architectures" by D. Minoli and A. Schmidt, published by John Wiley & Sons, New York, New York, 1998; pp. 308-324 (ISBN 0-471-19081-0).

U.S. Appl. No. 09/906,499, filed Jul. 16, 2001, Youssef Abdelilah et al.

* cited by examiner

Voice Over DSL

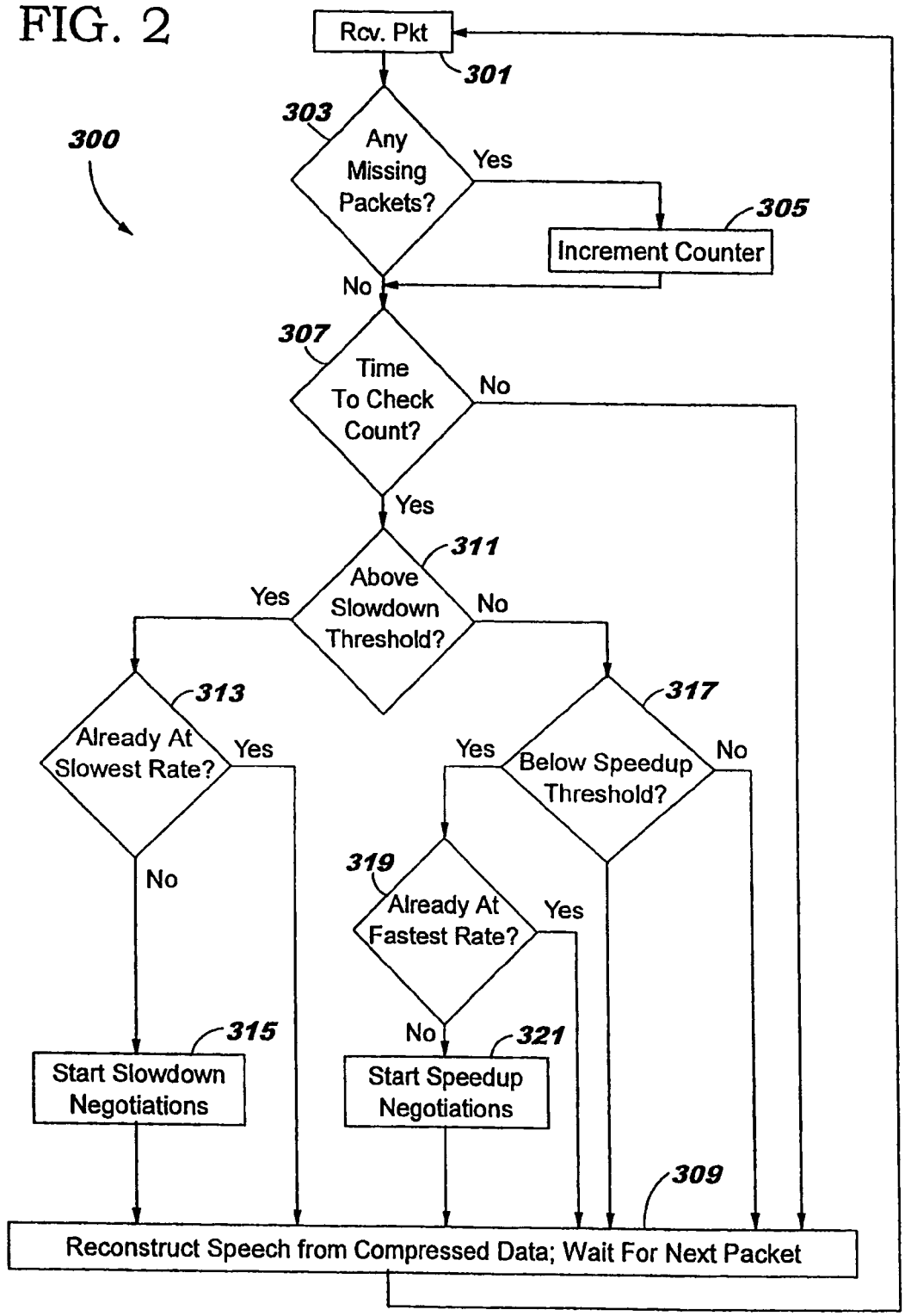

NETWORK CONGESTION DETECTION AND AUTOMATIC FALLBACK: METHODS, SYSTEMS AND PROGRAM PRODUCTS

PRIORITY

This application is a continuation-in-part of Ser. No. 09/906,406, filed Jul. 16, 2001 now U.S. Pat. No. 7,068,601 and assigned to the same assignee as that of the present invention. Applicants claim the benefit of the filing date of Ser. No. 09/906,406, presently pending before the USPTO.

RELATED APPLICATION

Copending application Ser. No. 09/906,499 entitled "CONTROLLING NETWORK CONGESTION USING A BIASED PACKET DISCARD POLICY FOR CONGESTION, VOICE & DATA PACKETS: METHODS, SYSTEMS, AND PROGRAM PRODUCTS" filed Jul. 16, 2001, assigned to the same assignee as that of the present invention and fully incorporated herein by reference.

BACKGROUND OF INVENTION

1. Field of Invention

This invention relates to communication network methods, system and program products. More particularly, the invention relates to codecs with network congestion detection and automatic fallback methods, systems & program products.

2. Description of Prior Art

Numerous different Speech Coder/Decoder techniques for compressing speech signals and recovering the original signals from the compressed data have been standardized by the International Telecommunications Union (ITU) (e.g., G.711, G.723.1, G.726, G.728, and G.729 A). There are many other codec techniques and algorithms which remain proprietary. Likewise, numerous codec algorithms (both standard and proprietary) have been applied to the compression of video signals. Various data codecs, such as compression, error correction, or encryption processors, could also be applied within the scope of this invention. The various codec algorithms typically provide a trade-off between implementation complexity (MIPs and Memory), bit rate required to support real-time sessions, and session quality. Thus one can typically choose a more complex algorithm to reduce the bit rate required to support a session, but in general the lower bit rate also typically results in lower quality session when passed through a coder/decoder pair. For instance lower bit rate connections for voice or video would typically result in lower quality speech or image signals as perceived by the user, while use of compressed data as opposed to uncompressed data might result in longer latency for a data session. Use of more effective error-correcting codes, with corresponding larger overhead could be applied to data sessions when excess bandwidth is available, potentially avoiding the need for retransmission of data received in error.

The codecs are typically useful in facilitating voice or video traffic within packet-based networks i.e., IP networks, including the Internet as well as private and virtual private networks. Compression functions are desirable since they reduce the load on the networks by reducing the bit rate required to support each session. A motivation for voice over packet networks is to reduce the cost of voice traffic (i.e., toll bypass), as well as to consolidate both voice and data onto a single network, thus reducing network management overhead. A second motivation of voice over packet technology is to connect a remote telephone into the Public Switched Telephone Network (PSTN) without using local phone service. Connecting a remote telephone into the PSTN is done by using a broadband link such as Asynchronous Digital Subscriber Line (ADSL) to carry the digitized voice from the subscriber's location through the local central office to a voice gateway. In either network configuration, the voice codec type is typically negotiated at the beginning of a voice session. Video over various packet networks is also highly desirable for video conferencing, distance learning, and video on demand applications.

ITU-T standard H.323 provides a protocol for two end-points to negotiate the desired codec for a session. Once established, codec parameters are typically fixed for the duration of a session. Typical user preference would be to always use the codec that results in the best session quality. Unfortunately, if there is significant traffic (many voice or video sessions as well as many data sessions) on the network, the higher throughput required for the desired session quality can result in lost packets (for both voice/video and data traffic) in the network due to router decisions to discard packets as queues become too full. Lost voice (video) packets degrade the speech (image) quality of voice (video) sessions, and lost data traffic may even make congestion worse because of a need to retransmit discarded data. The desirability of adjusting speech codec bit-rate in response to congestion was pointed out in the text "Digital Coding of Waveforms: Principles and Applications to Speech and Video" by Nuggehally S. Javant P. Noll, by Prentice Hall, Englewood Cliffs, N.J., November 1990. However there was no discussion in this reference as to how one should determine when to alter the coder bit rate. A paper entitled. "A dynamic rate control mechanism for integrated networks", Yin, N.; Hluchyj, M. G.; INFOCOM '91. Proceedings; Tenth Annual Joint Conference of the IEEE Computer and Communications Societies; Networking in the 90s; IEEE, 1991; Page(s): 543-552 vol. 2, discloses a technique whereby a network device could modify a packet header to indicate to the end nodes a congested network condition. However, the technique requires explicit packet modification within the network and would be difficult to implement on a widespread basis.

Accordingly, there is therefore a need to control the bandwidth consumed by voice sessions in a packet network in order to better control network congestion.

Other prior art related to network congestion control in packet networks includes:

U.S. Pat. No. 6,012,024 entitled "Method & Apparatus Encoding Digital Information" issued Jan. 4, 2000, filed Aug. 4, 1997 discloses a system in which a speech encoder receives speech signals (S) which are encoded and transmitted on a communication channel. Periods of silence in the speech are utilized by a data encoder to transmit data on the speech frequency band via the channel. A signal classifier switches between the encoders. The speech encoder has a synthesis filter with state variables in a delay line, predictor adaptor, gain predictor and excitation codebook. The data encoder has a delay line with state variables stored and updated in a buffer. On switching from data to speech, the buffer state variables are fed into the synthesis filter delay line via an input for smooth transition in the speech encoding. Coefficient values in the synthesis filter and an excitation signal are generated. Thereby a buffer in the gain predictor is preset and its predictor coefficients and gain are generated. The incoming speech signal (S) newly detected is encoded (CW) by the values generated in the speech encoder, which is successively adapted. The receiver side has corresponding speech and data decoders.

U.S. Pat. No. 5,907,822 entitled "Lost Tolerance Speech Decoder for Telecommunications" issued May 25, 1999, filed Apr. 4, 1997 discloses a method and device for extrapolating past signal-history data for insertion into missing data segments in order to conceal digital speech frame errors. The extrapolation method uses past-signal history that is stored in a buffer. The method is implemented with a device that utilizes a finite-impulse response (FIR) multi-layer feed-forward artificial neural network that is trained by back-propagation for one-step extrapolation of speech compression algorithm (SCA) parameters. Once a speech connection has been established, the speech compression algorithm device begins sending encoded speech frames. As the speech frames are received, they are decoded and converted back into speech signal voltages. During the normal decoding process, pre-processing of the required SCA parameters will occur and the results stored in the past-history buffer. If a speech frame is detected to be lost or in error, then extrapolation modules are executed and replacement SCA parameters are generated and sent as the parameters required by the SCA. In this way, the information transfer to the SCA is transparent, and the SCA processing continues as usual. The listener will not normally notice that a speech frame has been lost because of the smooth transition between the last-received, lost, and next-received speech frames.

U.S. Pat. No. 5,526,353 entitled "System & Method for Communication of Audio Data Over a Packet-Based Network" issued Jun. 11, 1996 discloses a system and method for communicating audio data in a packet-based computer network wherein transmission of data packets through the computer network requires variable periods of transmission time. The system comprises: (1) a packet assembly circuit for constructing a data packet from a portion of a stream of digital audio data corresponding to an audio signal, the packet assembly circuit generating a position identifier indicating a temporal position of the portion relative to the stream, inserting the position identifier into the data packet and queuing the data packet for transmission through a backbone of the computer network and (2) a packet disassembly circuit, having a buffer associated therewith, for receiving the data packet from the backbone, the packet disassembly circuit inserting the portion into an absolute location of the buffer, the position identifier determining the location, the portion thereby synchronized with adjacent portions of the stream of digital audio data in the buffer to compensate for the variable periods of transmission time.

U.S. Pat. No. 5,426,640 entitled "Rate-Based Adaptive congestion Control System and Method for Integrated Packet Networks" issued Jun. 20, 1995; filed Jan. 21, 1992 discloses an adaptive congestion control device and method that minimize congestion using independent congestion level indicators. The invention allows efficient recovery for an integrated packet network that becomes congested and allows a user to utilize the network on a space-available basis when capacity is available.

None of the prior art discloses voice codecs capable of detecting congestion in a packet network and responding to the congestion via a protocol such as ITU-T H.323 which enables the codecs to re-negotiate speech codec-type and/or parameters with the peer codec at the other side of the network to reduce the bit rate requirement for supporting a speech session.

SUMMARY OF INVENTION

An object of the invention is a system, method and program product which provides a compression/decompression function capable of detecting congestion in an associated packet network and re-negotiating session codec type and/or parameters at end points in the network to reduce the bit rate requirement for supporting a session.

Another object is a system, method and program product which provides congestion control packets into the network for the expressed purpose of providing the network with packets which can be discarded to indicate network congestion without impairing speech, video, and data transmissions.

Another object is a system, method and program product which provides thresholds for determining bit rate in a packet network, the thresholds based upon missing packets in a voice, video, and/or data stream occurring in a selected time interval and representative of congestion or the absence of congestion in a packet network.

Another object is a system, method and program product which delays the response of interacting codecs to resumed flow of congestion control packets to minimize thrashing between the codec types and focus on tracking long-term trends of network congestion.

These and other objects features and advantages are achieved in a codec method, system and program product which provides session compression and recovery of original session content from received compressed signal via a packet network or Digital Subscriber Line (DSL) incorporating a session set-up and control protocol such as the ITU-T H.323 protocol. The H.323 protocol manages two or more end points or codecs engaged in a conference by permitting them to re-negotiate bit rate and codec type. The codec is capable of detecting congestion in the network and responding to the congestion via the H.323 protocol which enables the codecs to re-negotiate session codec-type and/or parameters with the peer codec at the other side of the network to reduce the bit rate requirement for supporting a session. Each codec must be configured in accordance with a Service Level Agreement (SLA) negotiated with the network. At least two different codec types or two different bit-rates modes within the same codec type must be commonly supported between the two codecs. Users set up a session between the two codecs. Each of the codecs is configured in accordance with the previously negotiated SLA. The codecs select the codec type with the highest session quality from among a set of supported codec types. Once the connection and session are established, packets transporting encoded session content start flowing between the two codecs. A control entity will initially send and receive network congestion control packets periodically in the session. The control packets are short, since they contain no data and are not sent very often. The sole purpose of the congestion control packets is to provide a "heartbeat" indication to the codec at the other end of the session. Each codec may use the absence of "heartbeat" packet as an indication of network congestion. When the network is not congested, all "heartbeat" packets will be passed through the network. As network congestion increases, routers within the network discard excess packets to prevent catastrophic network failure. The codecs respond to the missing packets by slowing down the bit rate (if capable of independently adjusting transmitted bit rate without renegotiating with the peer device), or proceed to renegotiate a lower bit rate via the H.323 protocols. If there are no missing packets, the codecs detect if the session is operating at the highest bit rate, and if not, respond by re-negotiating a higher bit rate with a corresponding higher session quality. In operation, each time a packet is received at a codec, an operation determines whether or not there are any missing packets. When a missing packet is detected, an error counter is incremented. An operation determines if the error count should be checked. If it is not yet time to check the counter, the packet is processed using normal decoder reconstruction after which the codec waits to process the next packet. In processing the next packet, if it is determined to check the error counter, the current error count is saved for use in subsequent threshold comparisons and the error counter is reset to zero in preparation for error accumulation during the next interval. An operation compares the current error count against a slow down threshold. If the count is above the threshold, an operation determines whether or not the codec is already operating at the lowest bit rate. If not, the codecs enter into re-negotiation using H.323 to select a lower bit rate codec in order to reduce network congestion at the expense of lower session quality. Otherwise, the session continues to use the current bit rate. If the current error count is below the slow down threshold, an operation compares the error count to a speed-up threshold. Preferably, the speed-up threshold is set such that even if all codec packets are received successfully, consistently missing congestion control packets will prevent speed-up. If the count is below the speedup threshold, an operation determines whether the codec is already operating at the highest bit rate permitted. If not, an operation initiates re-negotiations under H.323 to select a higher bit rate codec with a corresponding higher session quality. Otherwise, the session continues to use the current codec. Once the checking of thresholds is complete, the packets are processed using normal decoder reconstruction after which the system waits to process the next packet.

DESCRIPTION OF THE DRAWINGS

The invention will be further understood from the following description of a preferred embodiment taken in conjunction an appended drawing, in which:

FIG. 2 is a flow diagram implementing the detection of network congestion and adjusting the bit rate to support codec sessions in FIG. 1.

DESCRIPTION OF PREFERRED EMBODIMENT

Figure 1:
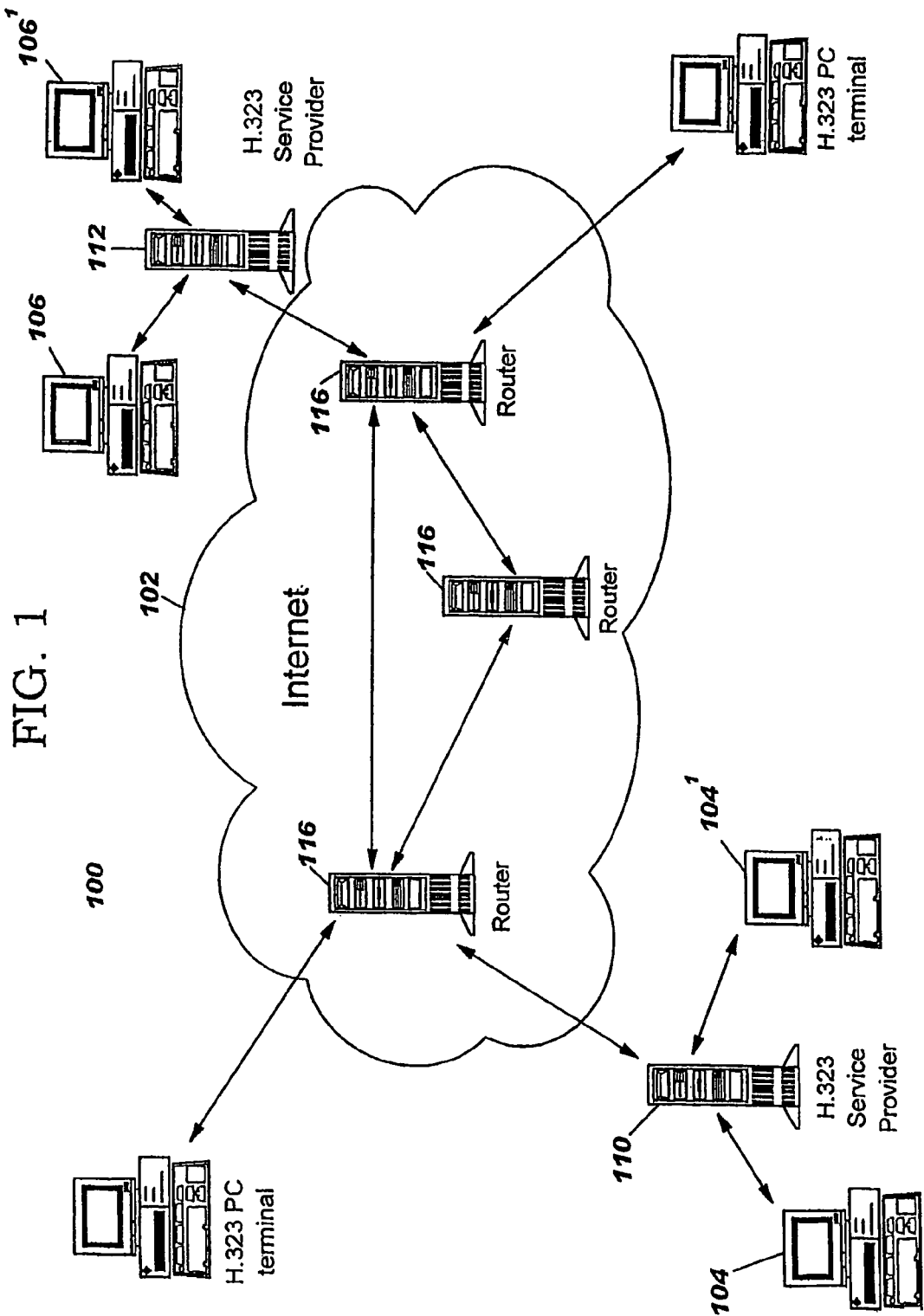
FIG. 1 is a representation of a packet network for voice, video, and data transmission between two or more client stations executing software applications for detecting network congestion to adjust network bit rate to support coded sessions and incorporating the principles of the present invention.

In FIG. 1, a network congestion detection and automatic correction system 100 for a packet network 102, typically the internet or a private network or a virtual network is disclosed, the system providing improved speech, video, and data transmissions to terminals or end points 104 and 106. The terminals are connected to the Internet via Internet Service Providers (ISP) 110 and 112, respectively. Other networks require similar access points. The service providers are in turn linked to routers 116 within the network 102 for directing the calls and data between the terminals 104 and 106. The operation of the internet for initiating and routing calls between terminals is well known and described, for example, in the text "Internet Architectures" by D. Minoli and A. Schmidt, published by John Wiley & Sons, New York, N.Y. 1998 (ISBN 0-471-19081-0).

Terminals 104, 106 and the service providers 110, 112 function according to the framework of International Telecommunications Union (ITU) H.323 Standard for audio, video and data communications across packet networks including the Internet. Alternately, H.323 enabled terminals 108, 109, are connected to the network via service providers that may not support H.323 functions. However, these terminals may establish H.323 sessions with other H.323-enabled terminals. H.323 allows multi-media products and applications from multiple vendors to inter-operate without concern for compatibility. H.323 covers a selection of audio and video codecs, shared applications, call control, and system control. H.323 includes ITU H.245 which is used to negotiate capabilities under control aspects of the conference between two or more end points. Details of H.323 are described in the International Telecommunications Union (ITU) specifications, and shown in FIG. 1A.

The terminals include coder/decoder techniques for compressing speech, video, or data signals and recovering the original signals from compressed data. The speech compression and decompression techniques have been standardized by the ITU, e.g., G.711, G.723.1, G.726, G.728, G.729A.

Figure 1A:
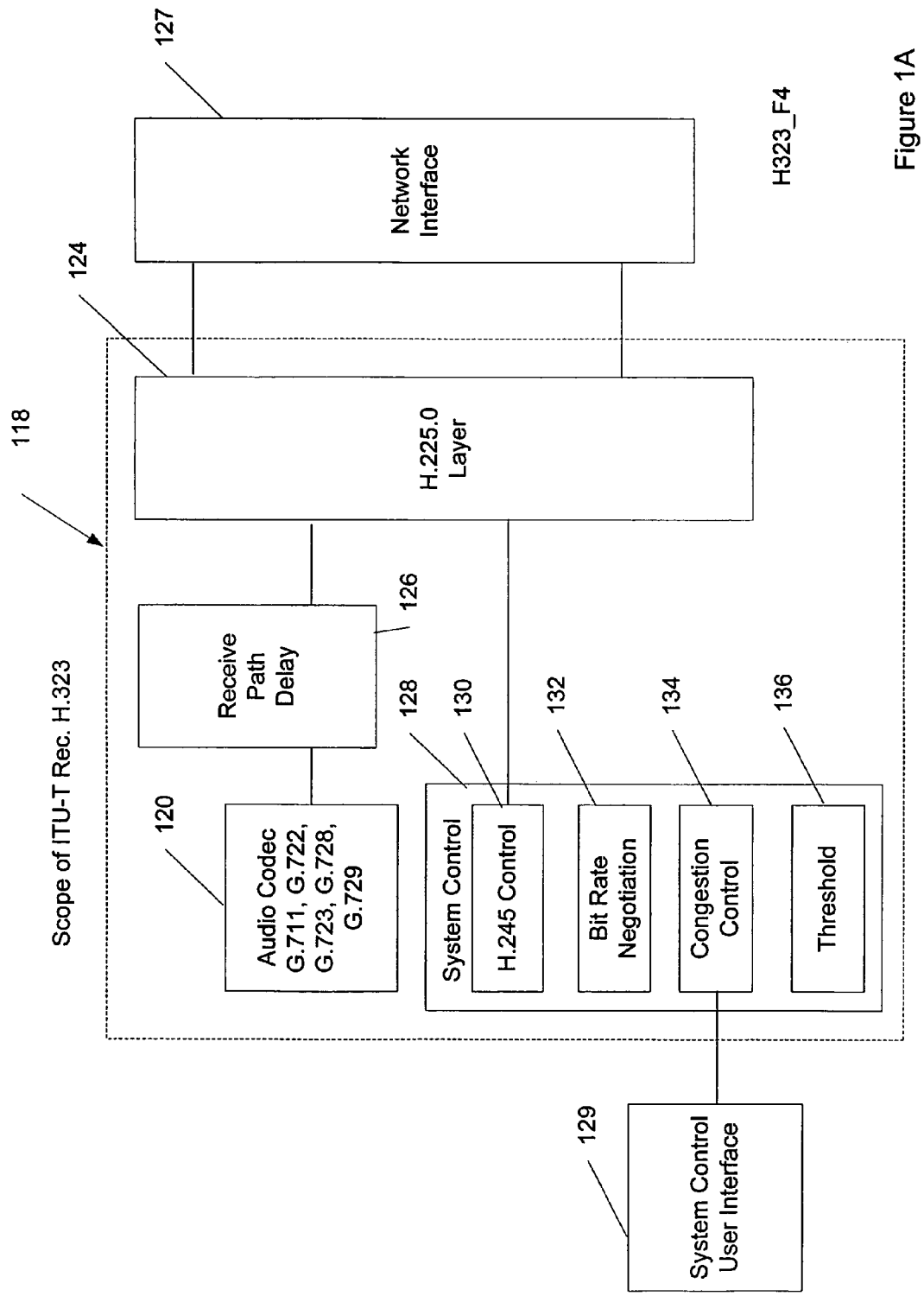
FIG. 1A is a representation of a H.323 terminal in the packet network of FIG. 1.

In FIG. 1A, an H.323 terminal 118 in included in the terminals 104 and 106, shown in FIG. 1. The terminal 118 includes a codec 120 coupled to a transmitter (Not Shown). The codec performs compression/decompression using any one of ITU compression/decompression algorithms, particularly G.723 and G.729. The codec provides an audio signal to an ITU H.225 layer 124 via a Receive Path Delay Unit 126, which minimizes jitter in the audio signal. The H.225 layer formats the transmitted audio and control streams into messages for output to a network interface 127, and retrieves received audio and control messages which have been input from the network. A system control unit 128 provides signaling for proper operation of the terminal 118. The unit 128 interfaces with a system control user interface 129 and the H.225 layer 124. Included in the unit 128 are a H.245 control layer 130, a bit rate negotiation unit 132, a congestion control unit 134 and a threshold unit 136. The H.245 control layer uses a H.245 control channel to carry end-to-end control messages governing operation of the H.323 terminal, including session control, capability exchange, opening and closing of logical channels, mode preference requests, flow control messages, and general commands. The overall operating details of the H.245 layer are described in the ITU H.323 recommendation at Section 6.2.8. The bit rate negotiation unit 132 implements Section B 12 of the H.245 recommendation for rate requests, acknowledging rate requests, rejecting rate requests and channel rate release. The congestion control unit 134 provides congestion control packets or Real Time Control Protocol packets, described in H.245 at Section 6.2.8.2 for flow control and detection of missing packets, as will be described in more detail hereinafter. The Threshold unit 136 has stored programs for implementing the detection of network congestion and adjusting the bit rate to support codec session, as will be described hereinafter in conjunction with a description of FIG. 2. The User interface 129 accesses the threshold unit for purposes of setting a slowdown threshold and speedup threshold, as will be described in conjunction with FIG. 2.

Figure 1B:
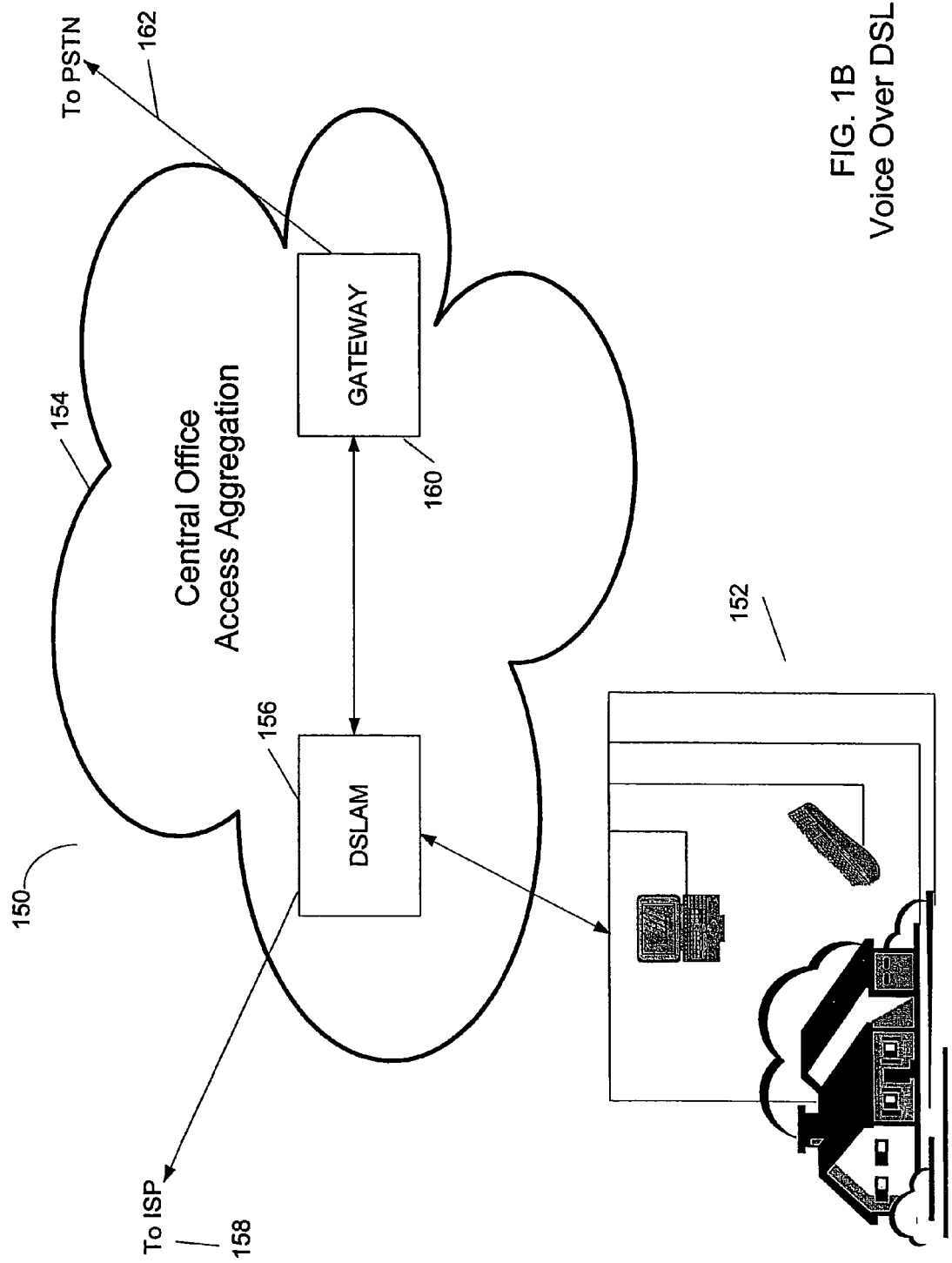
FIG. 1B is a representation of an alternate network environment in which a client station connected to the network via a high-speed access link such as DSL (Digital Subscriber Loop), cable modem, or wireless connection can communicate to individuals connected to the public telephone network via a gateway device.

In an alternative embodiment, a network congestion detection system 150 is shown in FIG. 1B. A terminal 152 is connected to a central office access aggregation 154 via a Digital Subscriber Line Access Multiplexer (DSLAM) 156 or other remote access technology (i.e. cable modem, wireless). The multiplexer is linked to an Internet Service Provider (ISP) 158 for digital communication and interacts with a voice gateway 160 (functionally described in H.323, Annex P) for voice communications to a Pubic Switch Telephone Network (PSTN) 162. System 150 automatically detects network congestion and corrects for congestion in the same manner as will now be described for the packet network shown in FIG. 1.

Returning to FIG. 1, a speech, video, or data session is set up between two H.323 terminals, e.g., 104, 106, executing compression/decompression algorithms, e.g., G.723, as voice codecs. The codecs 104, 106 compress and packetize the speech which is transmitted over the network using "UDP" protocol at the transport layer. One of the two codecs may be a voice gateway device 160 within the network as shown in FIG. 1A providing a means for the terminal at the other end to access the PSTN. Each of the codecs must be configured in accordance with a previously negotiated Service Level Agreement (SLA) with the operator of the network. The SLA defines, among other things, a preferred codec type and a guaranteed minimum bit rate (minimum session quality) codec type.

The terminals and the service providers 110, 112 execute software implementing the H.323 protocol which manages call signaling for two or more end points engaged in a session. The H.323 protocol, via H.245, Section 312 defines procedures for two voice codec devices to negotiate a commonly-agreed to codec type.

In the absence of significant network congestion, the terminals select the codec type with the highest session quality (typically also the highest bit rate, but lowest implementation complexity) from among the set of codec types which can be commonly supported between the two devices. At least two different codec types or two different bit rate modes within the same codec type must be commonly supported between the two terminal devices. It is preferable to select multiple bit rates within the same codec type in order to minimize the transient effects of switching from one bit rate to another. A particular response time advantage for switching rates can be achieved if the codec type includes an embedded bit stream with predetermined priorities associated with different groups of bits within a packet. When using such a codec type, a lower bit rate may be achieved without negotiating with the other end by simply dropping the lower priority bits in the encoding process, thus creating a smaller packet to send during each interval. The receiving decoder will automatically recognize that the received packet has less than the expected amount of data and since the priorities of the group of bits are predetermined, the decoder knows which bits were not sent, and knows how to recreate a lower quality speech signal with the bits received without having to negotiate the lower bit rate. The receiving decoder may optionally signal the co-located encoder to reduce the bit rate in the opposite direction by the same amount in order to better deal with the network congestion which was originally detected in that direction.

Once the connection is established between terminals 104, 106 and compressed or encoded data packets 107 start flowing over the "UDT" transport layer, H.323 control software typically becomes a background process, available for renegotiations or session termination but not actively processing the encoded packets. However, the H.323 control entity will send and receive network congestion control packets periodically using the "TCP" transport layer which has a larger header containing sequence numbers usable for flow control and detection of missing packets. The congestion control packets may, or may not use different layer 4 port numbers and, may or may not share port numbers with the H.323 session. The congestion control packets are short, since they contain no data, and are not sent very often (either one for every N encoded packets sent, or alternately, one for every M milliseconds in time). The sole purpose of the network congestion control packets is to provide a "heartbeat" indication to the codec at the other end of the session. Each codec receiver may use the absence of "heartbeat" packets from the other codec as an indication of network congestion. When a network is not congested, all "heartbeat" packets will be passed through. However, as network congestion increases, the routers 116 within the network are forced to discard excess packets in order to prevent catastrophic network failure.

The related application, Copending application Ser. No. 09/906,499, filed Jul. 16, 2001, supra, discloses controlling network congestion by recognizing "heartbeat" packets and discarding all packets classified as congestion control packets whenever a flow control mechanism detects congestion or a trend toward congestion, thereby stimulating any corresponding sessions to renegotiate codec type and/or parameters to realize lower bit rates for those sessions. Likewise, when network congestion is no longer a problem, the congestion control packets will be allowed to flow through the network, thus enabling the end user codec devices to renegotiate codec type again, this time back to a higher bit rate with corresponding higher session quality.

In the absence of detecting and manipulating congestion control packets, the codec devices of the present invention dynamically respond to lost packets (either congestion control packets or normal encoded packets) in order to minimize network congestion. The advantage of working with a network processing system described in the related application is that discarding packets can be focused specifically on packets which do not carry meaningful voice, image, or data and, thus, do not corrupt current session quality nor require data retransmission.

Alternatively, a network node can also stimulate end points to rapidly reduce codec bit rate by discarding both encoded packets and congestion control packets. The network can also explicitly delay restoring the flow of congestion control packets once encoded packets are flowing again to ensure codecs do not attempt to speed up to soon causing a reoccurrence of the network congestion.

FIG. 2 illustrates a processing loop 300 which is passed through once for each packet received at an end point in detecting network congestion or the absence of congestion, the process slowing down the bit rate or increasing the bit rate, respectively according to a predetermined threshold based upon a count of missing packets occurring in a selected time interval. Each time a packet is received in block 301, a first decision block 303 determines whether or not there are any missing packets. The missing packets can be determined by checking the packet sequence number or by keeping a running count of the number of encoded packets or a current time base counter to determine when to expect the next packet. Block 303 may not differentiate between missing encoded packets and congestion control packets. If block 303 determines that a packet is missing, an error counter in block 305 is incremented. The process 300 advances to Block 307 after incrementing the counter or determining no missing packets have been detected in Block 303. Block 307 determines whether or not a sampling interval has expired for checking the current error counter contents against predefined slow down or speed up bit rate thresholds. The sampling interval may be altered based on the current session codec bit rate, thus establishing a shorter sampling interval with corresponding faster response time when operating at a higher bit rate. The shorter sampling interval allows the process to quickly reduce bit rate to minimize network congestion while insuring that restoration of the higher bit rate does not occur too rapidly, resulting in bit rate "thrashing". It should be noted that there are numerous options known to those skilled in the art to filter the error count detected during each sampling interval so as to make the system less sensitive to instantaneous bursts of errors and enabling the system to focus on longer-term trends in congestion.

In Block 307, if the time interval has not expired to check missing packet count, the packet is passed through to Block 309 for standard processes in reconstructing speech from the compressed data, after which the process returns to block 301 to await the next packet. If Block 307 determines the time has expired to check the error counter, the current error count is saved for use in subsequent threshold comparison and reset to zero in preparation for error accumulation during the next time interval.

After the expiration of the time interval in decision block 307, missing packet count, if any, is compared to a slowdown threshold or a speed up threshold in terms of missing packet count for determining whether to slowdown or increase the session bit rate for the best speech quality consistent with network congestion or lack thereof. Several factors may influence the selection of both slowdown threshold and speedup threshold, such as the time interval for checking error count, any filtering characteristics which may be applied to the error count, as well as how the network responds to congestion (i.e., discard random packets, discard voice packets first, discard congestion control packets first). Speedup threshold is adjusted such that even if all speech packets are received successfully, consistently missing congestion control packets would prevent speedup. The slowdown threshold is set relative to the speedup threshold to achieve hysteresis, ensuring congestion has to get considerably better before speedup is attempted after slowdown. Additional benefit can be obtained by incrementally decreasing the speedup threshold each time the speedup threshold is activated, making it more difficult to go thorough multiple cycles of slowdown, then speedup. In a practical implementation, a time delay may be added to any decision to increase codec bit rates. Appropriate filtering of the error count may accomplish a similar goal. In either case, the intent is to track long-term congestion trends and not to respond to instantaneous peaks in packet traffic. Thus, the number of transitions between one codec type and another is minimized.

After the sampling or time interval has expired in Block 307, the process advances to Block 311 which determines whether the error count is above a slow down threshold determined as described above. If the count is above the slow down threshold, Block 313 determines whether the codec is already operating at the lowest bit rate permitted. If not, block 315 is entered and the codec initiates bit rate re-negotiations using H.323 messages with the sending codec to select a lower bit-rate codec to reduce network congestion, after which block 309 is entered to reconstruct the original session content from the encoded data. Where the bit rate is determined in Block 313 to be already at the lowest bit rate, the packet is passed to block 309 for reconstructing the original session content from the encoded data. In either case, after completing the reconstruction of the original session content, the process returns to block 301.

Returning to Block 311 if the missing packet count does not require a slowdown, the process transfers to Block 317 which determines whether the missing packet count is below the speedup threshold. Preferably, the speedup threshold is set such that even if all encoded session packets are received successfully, consistently missing congestion control packets would prevent speed up. If the session is already above the speedup threshold, Block 317 transfers the packet to Block 309 for reconstruction of original session data and return of the process to Block 301 to await processing of the next packet. If the count is below the speedup threshold, the process transfers to Block 319 which determines whether or not the codec is already operating at the highest bit rate permitted. If not currently at the highest permitted rate, the process transfers to Block 321 in which the receiving codec initiates bit rate re-negotiations with the sending codec to select a higher bit rate for the session with a corresponding higher session quality. After renegotiation is initiated, the original session content is reconstructed from the encoded data in the packet at 309 and the process returns to Block 301 to await the next packet for processing.

With the receiving codec already operating at the fastest rate in block 319, the session continues to use the current codec bit-rate. Preferably the highest bit-rate permitted represents the combined restrictions of the codecs at both ends of the session as determined during initial H.323 negotiations, and is saved during initial negotiations in order to avoid initiating a renegotiation which is incapable of resulting in a higher bit rate. Once the checking of speed up and slow down thresholds is complete, regardless of the process path taken through the various decision blocks, control passes to block 309 where the original session content is reconstructed, after which the system waits to process the next packet at which time control returns to the top of the loop. While the invention has been described in terms of a preferred embodiment various changes may be made without departing from the spirit and scope of the invention as defined in the appended claims, in which,

We claim:

1. Network congestion detection apparatus with automatic adjustment of bandwidth in response to congestion, comprising:

first and second codecs respectively coupled to a network, wherein a session is established for transmitting packets between the codecs and packets are initially transmitted at a bit rate selected from a plurality of initial bit rates, one of said initial bit rates comprising a pre-selected slowest bit rate, and another of said initial bit rates comprising a pre-selected fastest bit rate;

a bit rate negotiating component associated with each of said codecs for enabling its associated codec to negotiate transmission bit rates and bit rate changes for said session with the other codec;

a congestion indication component for intermittently transmitting congestion control packets during said session, wherein each congestion control packet contains no data, and said congestion indication component further detects a count of missing packets during said session for use in providing a missing packet count, wherein at least one of said missing packets included in said count comprises one of said congestion control packets;

a threshold device comprising a slowdown threshold component for comparing the missing packet count with a slowdown threshold, and in response to determining that the missing packet count is greater than the slowdown threshold, at a time when the transmission bit rate is greater than said pre-selected slowest bit rate, causing said first codec and said second codec to negotiate a lower transmission bit rate; and the threshold device further comprises a speedup threshold component for comparing the missing packet count with a speedup threshold, and in response to determining that the missing packet count is less than the speedup threshold, at a time when the transmission bit rate is less than said pre-selected fastest bit rate, causing said first codec and said second codec to negotiate a higher transmission bit rate.

2. The network apparatus of claim 1 further comprising:
responsive to determining that the missing packet count is greater than the slowdown threshold, at a time when the transmission bit rate is at said pre-selected slowest bit rate, said first codec and said second codec are not able to negotiate a lower bit transmission rate, and responsive to determining that the missing packet count is less than the speedup threshold, at a time when the transmission bit rate is at said pre-selected fastest bit rate, said first codec and said second codec are not able to negotiate a higher bit transmission rate.

3. The network apparatus of claim 1 wherein:
the bit rate negotiating component for each of said codecs is operable to both reject rate requests and recommend rate requests, when said first and second codecs are negotiating a lower or higher transmission bit rate, selectively.

4. The network apparatus of claim 1 wherein:
one of said codecs comprises a sending codec and the other codec comprises a receiving codec, and said transmission bit rate negotiations between said codecs are each initiated by said receiving codec.

5. The network apparatus of claim 1 further comprising:
delay apparatus which delays response of the interacting codec to resuming the flow of encoded session content and control indications at a higher bit-rate after a previous negotiation reduced the bit rate.

6. The network apparatus of claim 1 wherein the session is conducted over the Internet.

7. The network apparatus of claim 1 wherein the session is conducted over a private packet network.

8. The network apparatus of claim 1 wherein the session is conducted over a virtual private packet network.

9. The network apparatus of claim 1 wherein the session is conducted through a gateway to a Public Switched Telephone network.

10. The network apparatus of claim 1 wherein the session content consists of speech.

11. The network apparatus of claim 1 wherein the session content consists of image.

12. The network apparatus of claim 1 wherein the session content consists of video.

13. The network apparatus of claim 1 wherein the session content consists of compressible data.

14. An apparatus in a packet network for detection of network congestion and automatic adjustment of bandwidth in the network in response to congestion, comprising:
first and second codecs respectively coupled to the network, wherein a session is established for transmitting packets between the codecs and packets are initially transmitted at a bit rate selected from a plurality of initial bit rates, one of said initial bit rates comprising a pre-selected slowest bit rate, and another of said initial bit rates comprising a pre-selected fastest bit rate;
a bit rate negotiating component associated with each of said codecs for enabling its associated codec to negotiate transmission bit rates and bit rate changes for said session with the other codec;
a congestion indication component for intermittently transmitting congestion control packets during said session, wherein each congestion control packet contains no data, and said congestion indication component further detects missing packets during said session for use in providing a missing packet count, wherein at least one of said missing packets included in said count comprises one of said congestion control packets; and
a threshold device responsive to said missing packet count for determining whether to cause said first codec and said second codec to negotiate, selectively, a slower bit rate to reduce congestion, or a higher bit rate to improve session quality.

15. The apparatus of claim 14 wherein the threshold device further comprises:
a slowdown threshold component which compares an error counter versus a slowdown threshold and indicating whether the counter is above or below the slowdown threshold, and when not above the pre-selected slowest bit rate initiating the codecs to re-negotiate the session bit-rate to select a lower bit-rate to reduce network congestion.

16. The apparatus of claim 14 wherein the threshold device further comprises:
a speedup threshold component which determines if an error counter is below a speedup threshold and if so initiates the codecs to re-negotiate a higher bit rate for improved session quality, if the session is not already operating at the pre-selected fastest bit rate.

17. The apparatus of claim 14 wherein the congestion indication component intermittently transmits congestion control packets relating to the session as "heartbeat" signal for detection of congestion by the codecs.

18. The apparatus of claim 14 further comprising:
counter apparatus which records missing packets.

19. The apparatus of claim 14 further comprising:
delay apparatus which delays response of the codecs to resuming the flow of session content and control indications at a higher bit-rate after a previous re-negotiation reduced the bit rate.

20. The apparatus of claim 14 wherein the session content consists of speech.

21. The apparatus of claim 14 wherein the session content consists of image.

22. The apparatus of claim 14 wherein the session content consists of video.

23. The apparatus of claim 9 wherein the session content consists of compressible data.

24. A method of congestion detection in a packet network with automatic adjustment of bandwidth, wherein first and second codecs are respectively coupled to the network, said method comprising the steps of:
establishing a session for transmitting packets between the codecs, wherein the packets are initially transmitted at a bit rate selected from a plurality of initial bit rates, one of said initial bit rates comprising a pre-selected slowest bit rate, and another of said initial bit rates comprising a pre-selected fastest bit rate;
operating a bit rate negotiating component that is associated with each of said codecs, to enable its associated codec to negotiate transmission bit rates and bit rate changes for said session with the other codec;
intermittently transmitting congestion control packets during said session, wherein each congestion control packet contains no data;

detecting missing packets during said session for use in providing a missing packet count, wherein at least one of said missing packets included in said count comprises one of said congestion packets; and responsive to said missing packet count, determining whether to cause said first codec and said second codec to interact to negotiate a different bit rate.

25. The method of claim 24 further comprising:

intermittently transmitting congestion control packets relating to the session as "heartbeat" signal for detection of congestion by the interacting codecs.

26. The method of claim 24 further comprising:

delaying a response of a codec to resuming the flow of session content and control indications at a higher bit-rate after a previous re-negotiation reduced the bit rate.

27. The method of claim 24 further comprising:

determining if an error counter is below a speedup threshold and if so initiating the interacting codecs to re-negotiate a higher bit rate for improved session quality if the session is not already operating at the pre-selected fastest bit rate.

28. The method of claim 24 further comprising:

comparing an error counter versus a slowdown threshold and indicating whether the counter is above or below the slowdown threshold and when not above the pre-selected slowest bit rate initiating the interacting codecs to re-negotiate the session bit-rate to select a lower bit-rate to reduce network congestion.

* * * * *